United States Patent
Lee et al.

(10) Patent No.: US 9,666,184 B2
(45) Date of Patent: May 30, 2017

(54) METHOD AND APPARATUS FOR TRAINING LANGUAGE MODEL AND RECOGNIZING SPEECH

(71) Applicant: Samsung Electronics Co., Ltd., Suwon-si (KR)

(72) Inventors: Hoshik Lee, Yongin-si (KR); Heeyoul Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/727,462

(22) Filed: Jun. 1, 2015

(65) Prior Publication Data
US 2016/0163310 A1    Jun. 9, 2016

(30) Foreign Application Priority Data
Dec. 8, 2014  (KR) .................. 10-2014-0175152

(51) Int. Cl.
| | | |
|---|---|---|
| *G10L 25/30* | (2013.01) | |
| *G10L 15/16* | (2006.01) | |
| *G10L 15/06* | (2013.01) | |
| *G10L 15/19* | (2013.01) | |
| *G10L 15/187* | (2013.01) | |

(52) U.S. Cl.
CPC ............ *G10L 15/16* (2013.01); *G10L 15/063* (2013.01); *G10L 15/19* (2013.01); *G10L 25/30* (2013.01); *G10L 15/187* (2013.01)

(58) Field of Classification Search
CPC ................................. G10L 15/063; G10L 15/16
See application file for complete search history.

(56) References Cited

U.S. PATENT DOCUMENTS

| | | | | |
|---|---|---|---|---|
| 5,189,610 A | * | 2/1993 | Kaplan ................. | G06F 17/273 704/10 |
| 5,258,909 A | * | 11/1993 | Damerau ............... | G06F 17/273 704/9 |
| 5,799,269 A | * | 8/1998 | Schabes ................ | G06F 17/274 704/9 |
| 5,952,942 A | * | 9/1999 | Balakrishnan ........ | G06F 3/0237 341/20 |

(Continued)

FOREIGN PATENT DOCUMENTS

| | | |
|---|---|---|
| JP | 2001-67094 A | 3/2001 |
| JP | 2002-140089 A | 5/2002 |

(Continued)

OTHER PUBLICATIONS

Mikolov, Tomáš, et al., "Extensions of Recurrent Neural Network Language Model". Acoustics, Speech and Signal Processing (ICASSP), 2011 IEEE International Conference on, IEEE, May 2011, pp. 5528-5531, XP032001936.

(Continued)

*Primary Examiner* — Douglas Godbold
(74) *Attorney, Agent, or Firm* — NSIP Law

(57) ABSTRACT

A method and apparatus for training a neural network language model, and a method and apparatus for recognizing speech data based on a trained language model are provided. The method of training a language model involves converting, using a processor, training data into error-containing training data, and training a neural network language model using the error-containing training data.

14 Claims, 17 Drawing Sheets

(56) References Cited

U.S. PATENT DOCUMENTS

| | | | | |
|---|---|---|---|---|
| 6,006,183 | A | * | 12/1999 | Lai .................... G10L 15/22 704/235 |
| 6,006,221 | A | * | 12/1999 | Liddy ............ G06F 17/30011 |
| 6,078,885 | A | * | 6/2000 | Beutnagel ........... G10L 15/063 704/231 |
| 6,131,102 | A | * | 10/2000 | Potter .................. G06F 17/273 715/257 |
| 6,182,039 | B1 | * | 1/2001 | Rigazio ............... G10L 15/193 704/239 |
| 6,208,964 | B1 | * | 3/2001 | Sabourin ............. G10L 15/063 704/235 |
| 6,272,462 | B1 | * | 8/2001 | Nguyen ............... G10L 15/075 704/243 |
| 6,374,210 | B1 | * | 4/2002 | Chu .................... G06F 17/2863 704/9 |
| 6,842,734 | B2 | | 1/2005 | Yamada et al. |
| 6,848,080 | B1 | * | 1/2005 | Lee .................... G06F 17/2223 704/9 |
| 6,934,683 | B2 | * | 8/2005 | Ju ........................ G10L 15/18 379/88.01 |
| 6,941,264 | B2 | * | 9/2005 | Konopka ............. G10L 15/065 704/243 |
| 8,326,457 | B2 | * | 12/2012 | Kwon .................. B25J 13/003 700/246 |
| 8,370,139 | B2 | | 2/2013 | Akamine et al. |
| 2014/0229158 | A1 | | 8/2014 | Zweig et al. |

FOREIGN PATENT DOCUMENTS

| | | |
|---|---|---|
| JP | 4233831 B2 | 12/2008 |
| KR | 2002-0067870 A | 8/2002 |

OTHER PUBLICATIONS

Mikolov, Tomas, et al., "Efficient Estimation of Word Representations in Vector Space". (URL:http://arxiv.org/abs/1301.3781, retrieved on Dec. 15, 2015), Jan. 2013, XP055192736 (12 pages).

Mikolov, Tomas, et al., "Linguistic Regularities in Continuous Space Word Representations". Proceedings of NAACL-HLT, Jun. 2013, pp. 746-751, XP055167325.

Soutner, Daniel, et al., "Application of LSTM Neural Networks in Language Modelling", Grid and Cooperative Computing—GCC 2004: Third International Conference, Wuhan, China, Oct. 2004. In: Lecture Notes in Computer Science, ISSN 0302-9743; vol. 3251; (Lecture Notes in Computer Science, ISSN 1611-3349), Sep. 2013, XP047039006, Springer Verlag.

Yujing, Si, et al., "Recurrent Neural Network Language Model with Vector-Space Word Representations". The 21st International Congress on Sound and Vibration, Jul. 2014, XP055236415, Beijing, China.

Extended European Search Report issued on Jan. 5, 2016 in counterpart European Patent Application No. 15191550.1 (8 pages, in English).

* cited by examiner

METHOD AND APPARATUS FOR TRAINING LANGUAGE MODEL AND RECOGNIZING SPEECH

CROSS-REFERENCE TO RELATED APPLICATION

This application claims the benefit under 35 USC 119(a) of Korean Patent Application No. 10-2014-0175152 filed on Dec. 8, 2014, in the Korean Intellectual Property Office, the entire disclosure of which is incorporated herein by reference for all purposes.

BACKGROUND

1. Field

The following description relates to technology that trains a neural network language model, and technology that performs speech recognition based on a language model.

2. Description of Related Art

Pattern recognition can be applied to various technologies, including the recognition of handwritten characters, medical diagnosis using imaging technologies, and detecting faults in machinery design. Human brain is capable of effortlessly recognizing patterns in visual images. However, performing efficient and accurate pattern recognition with a computer has been immensely difficult.

To classify an input pattern as a member that belongs to a predetermined group, researchers are actively conducting researches on the method of applying the efficient and accurate pattern recognition performed by people to a computer. One such area of research is focused on an artificial neural network that models characteristics of biological nerve cells of a human by mathematical expressions. To classify an input pattern as a predetermined group, the neural network employs an algorithm that simulates a learning capability of a human brain. Through this algorithm, the neural network may generate mapping between the input pattern and output patterns. The capability of generating such a mapping may be referred to as a learning capability of the neural network. Further, the neural network may have a generalization capability of generating a relatively accurate output with respect to an input pattern yet to be used for learning, based on a result of learning.

Technology that performs speech recognition using such a neural network is recently being studied. For example, researches are continuously conducted to increase an accuracy of speech recognition in various environments, such as an environment that includes a speech of a neighboring user or external noise.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of training a language model involves converting, using a processor, training data into error-containing training data, and training a neural network language model using the error-containing training data.

The converting may involve selecting a word to be replaced with an erroneous word from words in the training data, and generating the error-containing training data by replacing the selected word with the erroneous word.

The converting may further involve selecting the erroneous word from a plurality of candidate words associated with the selected word.

The candidate words may be determined based on phonetic similarities to the selected word.

The selecting of the erroneous word may involve selecting the erroneous word based on weights assigned to the candidate words.

The selecting may involve randomly selecting the word from the words in the training data.

The general aspect of the method may further involve determining whether the training data is to be converted into the error-containing training data.

In another general aspect, a method of training a language model may involve converting, using a processor, words in training data into vector values based on phonetic similarities among words, and training a neural network language model using the vector values.

The converting may involve converting the words in the training data into the vector values by applying an acoustic embedding matrix to the words in the training data.

The converting may involve determining vector values of the words in the training data using the acoustic embedding matrix so that phonetically similar words are disposed at adjacent positions in a vector space.

The acoustic embedding matrix may be determined based on phonetic similarities among training words, and the phonetic similarities among the training words may be determined based on phonetic similarities among phoneme sequences of the training words.

The acoustic embedding matrix may be determined by applying multi-dimensional scaling (MDS) to an interword distance matrix, and the interword distance matrix may be a matrix representing a phonetic distance between different words.

In another general aspect, a non-transitory computer-readable storage medium including a program comprising instructions to cause a computer to perform the above described method is provided.

In yet another general aspect, an apparatus for training a language model includes a training data converter configured to convert training data into error-containing training data, and a language model trainer configured to train a neural network language model using the error-containing training data.

The training data converter may be configured to select a word to be replaced with an erroneous word from words in the training data, and may generate the error-containing training data by replacing the selected word with the erroneous word.

The training data converter may be configured to select the erroneous word from a plurality of candidate words determined based on phonetic similarities to the selected word.

The general aspect of the apparatus may further include a controller configured to determine whether the training data is to be converted into the error-containing training data.

In another general aspect, an apparatus for training a language model includes a training data converter configured to convert words in training data into vector values based on phonetic similarities among words, and a language model trainer configured to train a neural network language model using the vector values.

The training data converter may be configured to convert the words in the training data into the vector values by applying an acoustic embedding matrix to the words in the training data.

In another general aspect, an apparatus for training a language model includes a processor configured to introduce an error into training data for training a neutral network language model to generate error-containing training data, and training the language model using the error-containing training data.

The processor may generate the error-containing training data by retrieving the training data from a memory storage and replacing a selected word included in the training data with an erroneous word selected based on phonetic similarity of the erroneous word to the selected word.

The processor may be configured to use the trained language model to convert a speech received from a microphone into output data.

The general aspect of the apparatus described above may be configured to use the output data as a user command in controlling applications on the apparatus.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
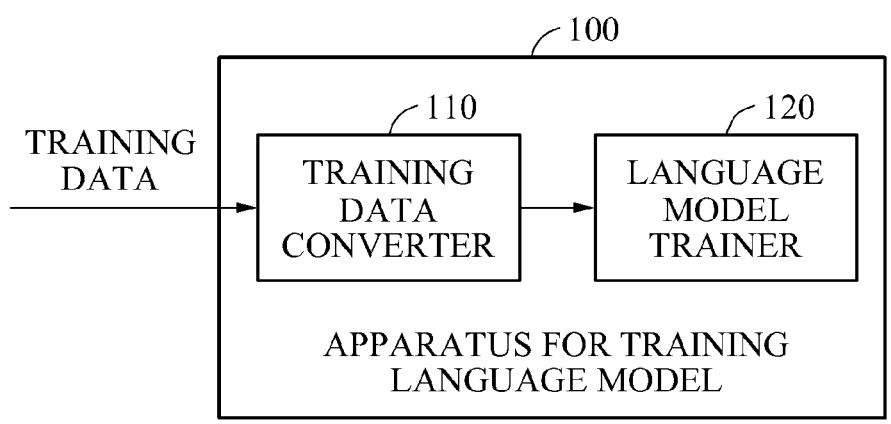
FIG. 1 is a block diagram illustrating an example of an apparatus for training a language model.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples are described in detail with reference to the accompanying drawings. The following specific structural or functional descriptions are exemplary to merely describe the examples, and the scope of the examples is not limited to the descriptions provided in the present specification. Various changes and modifications can be made thereto by those of ordinary skill in the art. Like reference numerals in the drawings denote like elements, and a known function or configuration will be omitted herein.

FIG. 1 illustrates an example of an apparatus for training a language model.

Referring to FIG. 1, an apparatus 100 for training a language model includes a training data converter 110 and a language model trainer 120. The training data converter 110 and the language model trainer 120 may be implemented using one or more processor and/or memory. The training data converter 110 may convert input training data retrieved from a memory storage, and the language model trainer 120 may train a neural network language model based on the converted training data. A neural network language model refers to a language model based on one or more neural network, exploiting the ability of neural networks to learn a large number of training examples.

Figure 16:
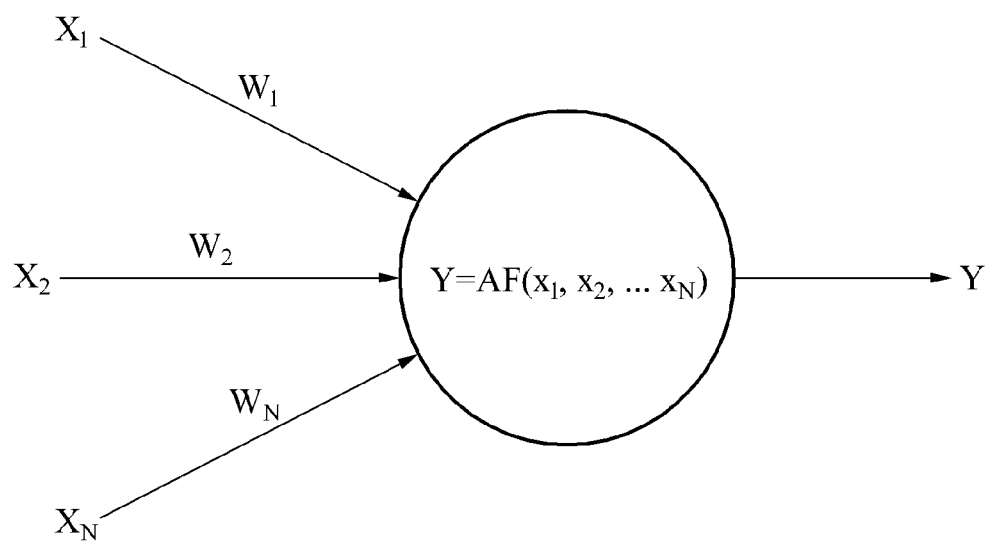
FIG. 16 is a schematic diagram illustrating an example of an artificial neuron.

The apparatus 100 for training a language model may train the neural network language model based on training data. A neural network refers to a recognition model implemented as software or hardware that simulates the computation capability of a human brain by using a large number of artificial neurons or nodes. Artificial neurons may be connected to each other through edges having connection weights or connection strengths. The connection weights may be predetermined values of the edges. The neural network may perform a cognitive function or a learning process of a human brain through the artificial neurons. An instance of an artificial neuron is illustrated in FIG. 16 as an example. In this example, the artificial neuron is implemented with a node as a body of the artificial neuron and with an input vector of the node and an output vector of a previous artificial neuron forming an edge between the node and a previous node. However, various modifications to the data structure of the artificial neuron would be apparent to those skilled in the art, and such modifications are within the scope of the present disclosure.

Referring to FIG. 16, the artificial neuron is capable of accepting inputs $X_1$ to $X_N$ from n input sources. The n input sources may be, for instance, synapses of another artificial neuron, sensors, input data storage or other data sources. The input vectors that connect the body of the artificial neuron to the inputs $X_1$ to $X_N$ may be scaled with individual synaptic weights $W_1$ to $W_N$. The received inputs may be combined by a linear summation, or additional functions may be applied to combine the received inputs based on an activation function $AF(x_1, x_2 \ldots x_N)$. Based on the activation function $AF(x_1, x_2 \ldots x_N)$, the body of the neuron adjust the combined inputs to generate an output "Y." According to one example, the result of the activation function $AF(x_1, x_2 \ldots x_N)$ must exceed a threshold value for the neuron to fire the output "Y" to the next neuron. Various modifications to the structure of the artificial neurons are possible, and such variations are within the scope of the present disclosure.

Figure 17:
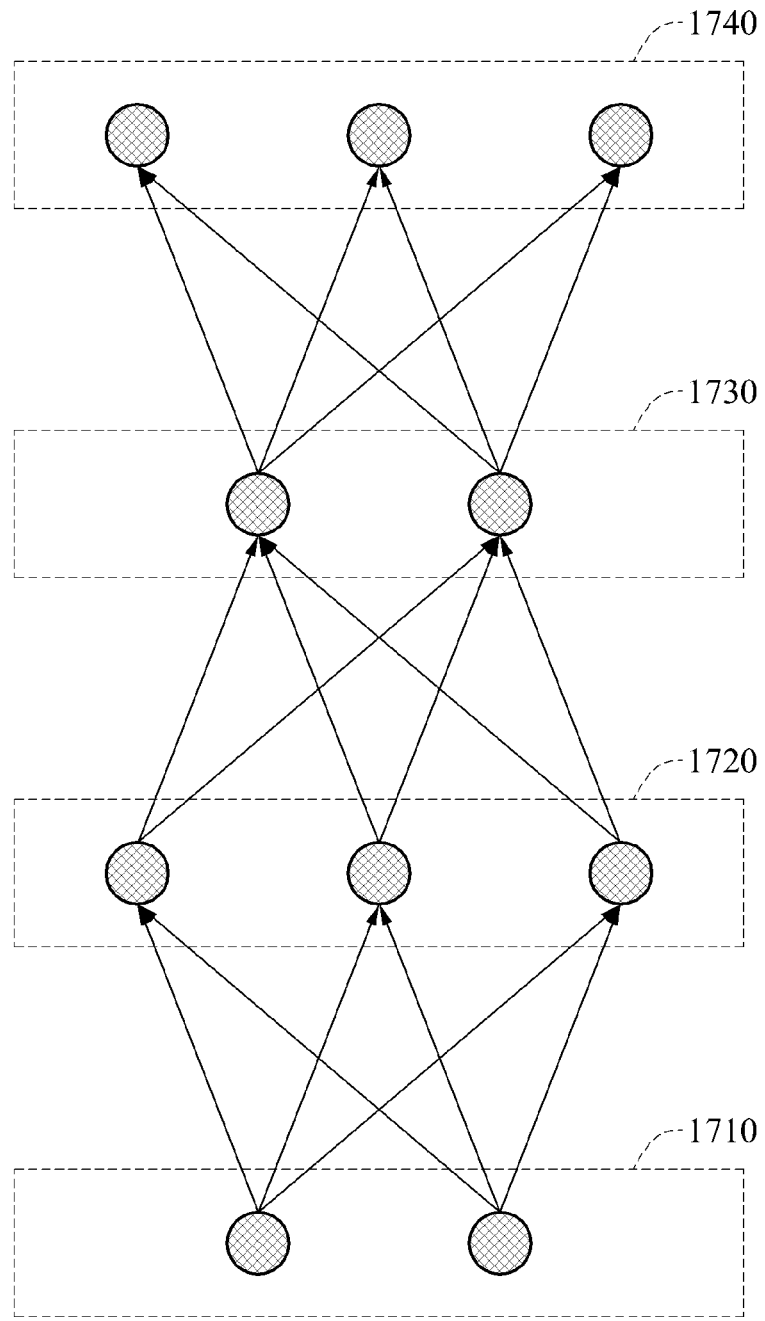
FIG. 17 is a schematic diagram illustrating an example of a neural network.

FIG. 17 illustrates an example of a neural network. The neural network 1700 may include a plurality of layers 1710, 1720, 1730, 1740. Each layer includes one or more nodes, which correspond to artificial neurons. For example, the neural network 100 includes an input layer 1710, two hidden layers 1720, 1730, and an output layer 1730. The input layer 1710 receives an input and transmits the received input to the hidden layers 1720, 1730, and the output layer 1740 generates an output of the neural network 1700 based on signals received from the hidden layer 1730.

Although FIG. 17 illustrates an example in which two hidden layers 1720, 1730 are provided between the input layer 1710 and the output layer 1730, another example of a neural network may include one hidden layer or more than two hidden layers. A neural network that includes a plurality of hidden layers are referred to as a deep neural network.

A language model may provide a probability value determined based on a connection relationship between words. The language model may provide a probability value for a word to follow an input word using a recognition function of a neural network. For example, when a word "this" is input into the language model, the language model may determine a probability value of a case in which "is" or "was" follows "this". Such a language model may be applied to various smart devices, for example, smart phones and smart TVs, to recognize a speech. Further, the language model may be used for a speech-based personal assistance service such as an S-Voice application, a voice command system for vehicles, and an application such as voice dictation.

Referring to FIG. 1, the apparatus 100 for training a language model may change training data to be used for training, and train the neural network language model based on the changed training data. The apparatus 100 for training a language model may include an artificially introduced error in the training data, or convert the training data into a vector value based on phonetic similarities. By the virtue of training based on such modified training data, the apparatus 100 may obtain a language model that is robust against noise included in speech data. For example, even when speech data that includes noise is input into the language model, a probability of the language model accurately processing the noise-including speech data may be increased because the language model was obtained by training with modified training data.

Hereinafter, with respect to an apparatus 100 for training a language model that trains a neural network language model, an example of a method of artificially including an error in training data will be first described, and an example of a method of converting training data based on phonetic similarities among words will be then described.

<Example of a Method of Artificially Including Error in Training Data>

The apparatus 100 for training a language data may train a neural network language model by adding an error or noise to the training data. A language model that were trained with artificial error-containing training data exhibits an increased probability of outputting a correct answer with respect to a subsequent word during a recognition process even when an error is included in a word input provided to the language model. Thus, continuous error propagation may be minimized with such a language model. When a predetermined word in a word sequence is incorrectly recognized due to noise, a connection relationship with the incorrectly recognized word may increase a probability of incorrectly recognizing a word subsequent to the predetermined word. To minimize incorrect recognition of speech data by noise, the apparatus 100 for training a language model may train the language model by first artificially adding an error to the training data and then using the error-containing training data to train the language model.

The training data converter 110 may convert the training data into error-containing training data. The training data converter 110 may select at least one word to be replaced with an erroneous word from among words found in the training data. For example, the training data converter 110 may select a last word or a randomly selected word, among the words present in the training data. The selected word may be replaced with an erroneous word or an incorrect word.

The training data converter 110 may select the erroneous word from among a plurality of candidate words. The candidate words may be determined based on phonetic similarities between words. The candidate words may be phonetically similar to the word to be replaced with the erroneous word. For example, when the word to be replaced with the erroneous word is "write", the candidate words may be "wrote", "rewrite", "light", "right", and "lite" which are phonetically similar to "write". The training data converter 110 may select the erroneous word from among the candidate words "wrote", "rewrite", "light", "right", and "lite". A probability of each candidate word being selected as an erroneous word may be identical, or a predetermined candidate word may have a relatively high probability of being selected as an erroneous word. For example, when "write" is incorrectly recognized as "right" with a highest frequency among the candidate words "wrote", "rewrite", "light", "right", and "lite" with respect to "write", "right" may be set to have a relatively high probability of being selected as an erroneous word of "write", when compared to the other candidate words.

Candidate words with respect to each word to be replaced with an erroneous word may be pre-learned and stored. For example, all words in a dictionary may be converted into continuous vector values of an embedding space through an acoustic embedding method, and words within a predetermined Euclidean distance from a given word may be determined to be candidate words. Phonetically similar words may be converted into similar vector values through the acoustic embedding method, and disposed at adjacent positions in a space expressing vector values.

The training data converter 110 may generate the error-containing training data by replacing the selected word with the erroneous word. The error-containing training data may be input into the neural network language model from a memory storage, and the language model trainer 120 may train the neural network language model using the error-containing training data.

The language model trainer 120 may train the neural network language model through supervised learning. Supervised learning refers to a method of inputting training data and output data corresponding thereto into a neural network, and updating connection weights of edges among artificial neurons so that the output data corresponding to the training data may be output. For example, the language model trainer 120 may update the connection weights of the edges among the artificial neurons through error back-propagation learning. Error back-propagation learning refers to a method of estimating an error in provided training data through forward computation, and updating connection weights to reduce errors while propagating the estimated error in a backward direction from an output layer of a neural network toward a hidden layer and a projection layer of the neural network.

The language model trainer 120 may define an objective function to be used to measure optimalities of currently set connection weights in the neural network, continuously change the connection weights based on a result of the objective function, and iteratively perform training. For example, the objective function may be an error function to be used by the neural network to calculate an error between an actual output value and an expected value desired to be output based on training data. The language model trainer 120 may compare an output value generated in the output layer of the neural network to a desired expected value with respect to the training data, and adjust the connection weights to reduce a difference between the output value and the expected value.

<Example of Converting Training Data Based on Phonetic Similarities Among Words>

The apparatus 100 for training a language model may train the neural network language model based on acoustic embedding. Acoustic embedding refers to a method of expressing a word in a vector space based on phonetic similarities among words. Through acoustic embedding, phonetically similar words, for example, "write", "wrote", "rewrite", "light", "right", and "lite", may have similar vector values or similar feature values. The apparatus 100 for training a language model may convert words to be input into the neural network into vector values based on phonetic similarities, and train the neural network based on the converted vector values. By training the neural network using acoustic embedding, a probability of the neural network outputting a correct word may increase although a phonetically similar word is input into the neural network as an error.

The training data converter 110 may convert words in the training data into vector values based on phonetic similarities among words. The training data converter 110 may convert the words in the training data into the vector values based on the phonetic similarities using an acoustic embedding matrix being a pre-learned conversion matrix. The training data converter 110 may convert the words in the training data into the vector values based on the phonetic similarities by applying the acoustic embedding matrix to the words in the training data. The training data converter 110 may determine vector values of the words in the training data using the acoustic embedding matrix so that phonetically similar words may be disposed at adjacent positions in a vector space.

The words in the training data may be converted into continuous vector values by the acoustic embedding matrix, and input into the neural network. Through the acoustic embedding matrix, phonetically similar words may be converted into similar vector values. In an acoustic embedding space expressed by acoustic embedding, the phonetically similar words may be disposed relatively close to each other. For example, vector values of phonetically similar words, for example, "write", "wrote", and "rewrite", may be disposed relatively adjacent to each other in the acoustic embedding space.

The apparatus 100 for training a language model may train the acoustic embedding matrix as follows.

The apparatus 100 for training a language model may convert words in a dictionary into vector values for the acoustic embedding matrix based on phonetic similarities among words. The apparatus 100 for training a language model may determine a distance matrix among phonemes constituting the words in the dictionary. A phoneme refers to a smallest unit of sound that causes a change in meaning of a word. A word may include one or more phonemes. The distance matrix among phonemes refers to a matrix representing phonetic distances indicating phonetic similarities among the phonemes. The more similar phonetic values of phonemes, the shorter a phonetic distance therebetween. A phoneme sequence of a word refers to a continuous sequence of phonemes included in the word. For example, a phoneme sequence of "rewrite" is [r iy r ay t], and a length of the phoneme sequence is "5". The apparatus 100 for training a language model may determine phonetic distances among phonemes by comparing phoneme sequences of the words, and represent the phonetic distances among the phonemes as a distance matrix among the phonemes.

The apparatus 100 for training a language model may determine an interword distance matrix based on the distance matrix among the phonemes. The interword distance matrix refers to a matrix representing phonetic distances among words, and the phonetic distances among the words refers to phonetic distances among phoneme sequences of the words. In an example, the apparatus 100 for training a language model may determine the phonetic distances among the words based on a distance calculation scheme modified from a Levenshtein distance scheme. For example, the apparatus 100 for training a language model may calculate a phonetic distance between words based on a "phonetic distance between phonemes", in lieu of "1", as a unit distance per character. The apparatus 100 for training a language model may determine an acoustic embedding table including information on a vector value of each word by applying multi-dimensional scaling (MDS) to the interword distance matrix. MDS refers to a scheme of measuring features of entities, and disposing the entities at points in a multi-dimensional space based on similarities among the entities determined based on the measured features. The apparatus 100 for training a language model may determine the acoustic embedding matrix based on the information on the vector value of each word included in the acoustic embedding table and the phoneme sequence of the words.

The language model trainer 120 may train the neural network language model through supervised learning. The language model trainer 120 may train the neural network language model based on vector values with respect to the words in the training data. For example, the language model trainer 120 may update connection weights among artificial neurons through error back-propagation learning. The language model trainer 120 may define an objective function to be used to measure optimalities of currently set connection weights in the neural network, change the connection weights based on a result of the objective function, and iteratively perform training. Through the foregoing process, although phonetically similar incorrect words are input into the neural network language model, a probability of outputting a correct answer may increase.

Figure 2:
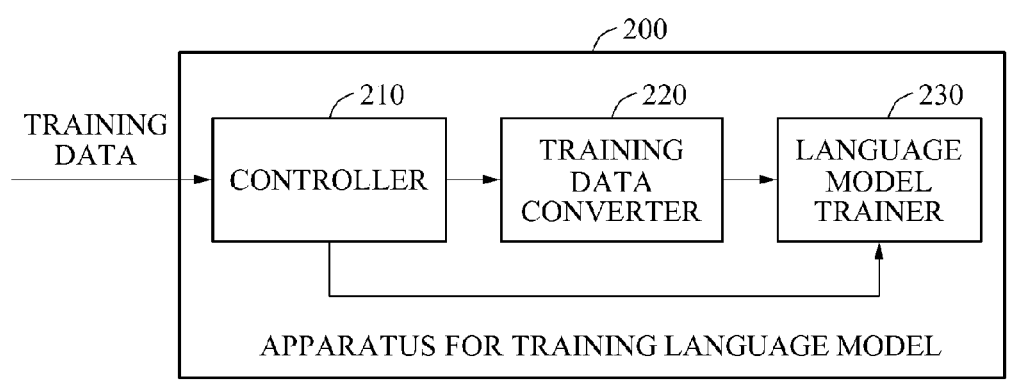
FIG. 2 is a block diagram illustrating an example of an apparatus for training a language model.

FIG. 2 illustrates an example of an apparatus for training a language model.

Referring to FIG. 2, an apparatus 200 for training a language model includes a controller 210, a training data converter 220, and a language model trainer 230. The apparatus 200 for training a language model may convert training data under a predetermined condition and train a neural network language model using the converted training data. The controller 210, the training data converter 220, and the language model trainer 230 may be implemented with a hardware component, such as a controller, a chip, a processor, a memory or a combination thereof. The training data may be retrieved from a hardware component such as a memory.

The controller 210 may determine whether the training data is to be converted into error-containing training data. For example, the controller 210 may determine, at random, whether input training data is to be converted into error-containing training data. In another example, the controller 210 may determine the training data to be converted into error-containing training data based on a predetermined iteration period. For example, the controller 210 may determine the training data to be converted into the error-containing training data at a probability of 50%, or determine the training data to be converted into the error-containing training data every time a training count corresponds to a multiple of 3, for example, 3, 6, 9, and the like.

When the training data is determined to not include an error, the controller 210 may control the language model trainer 230 to train the neural network language model using the original training data input into the apparatus 200 for training a language model.

When the training data is determined to be converted into error-containing training data, the controller 210 may control the training data converter 220 to convert the training data into the error-containing training data. The training data converter 220 may convert the training data into the error-containing training data based on the control of the controller 210. The training data converter 220 may select at least one word to be replaced with an erroneous word from among words in the training data. For example, the training data converter 220 may select a last word or a randomly determined word, among the word in the training data, as the word to be replaced with the erroneous word.

The training data converter 220 may select the erroneous word from among a plurality of candidate words associated with the selected word. The candidate words may be determined based on phonetic similarities among words. For example, the candidate words may be phonetically similar to the word to be replaced with the erroneous word. Candidate words with respect to each word to be replaced with an erroneous word may be pre-learned and stored. The training data converter 220 may generate the error-containing training data by replacing the selected word with the erroneous word. The error-containing training data may be input into the neural network language model, and the language model trainer 230 may train the neural network language model using the error-containing training data.

The language model trainer 230 may train the neural network language model through supervised learning. For example, the language model trainer 230 may update connection weights of edges among artificial neurons included in the neural network through a delta rule and error back-propagation learning. The language model trainer 230 may define an objective function to be used to measure optimalities of currently set connection weights in the neural network, change the connection weights based on a result of the objective function, and iteratively perform training.

Figure 3:
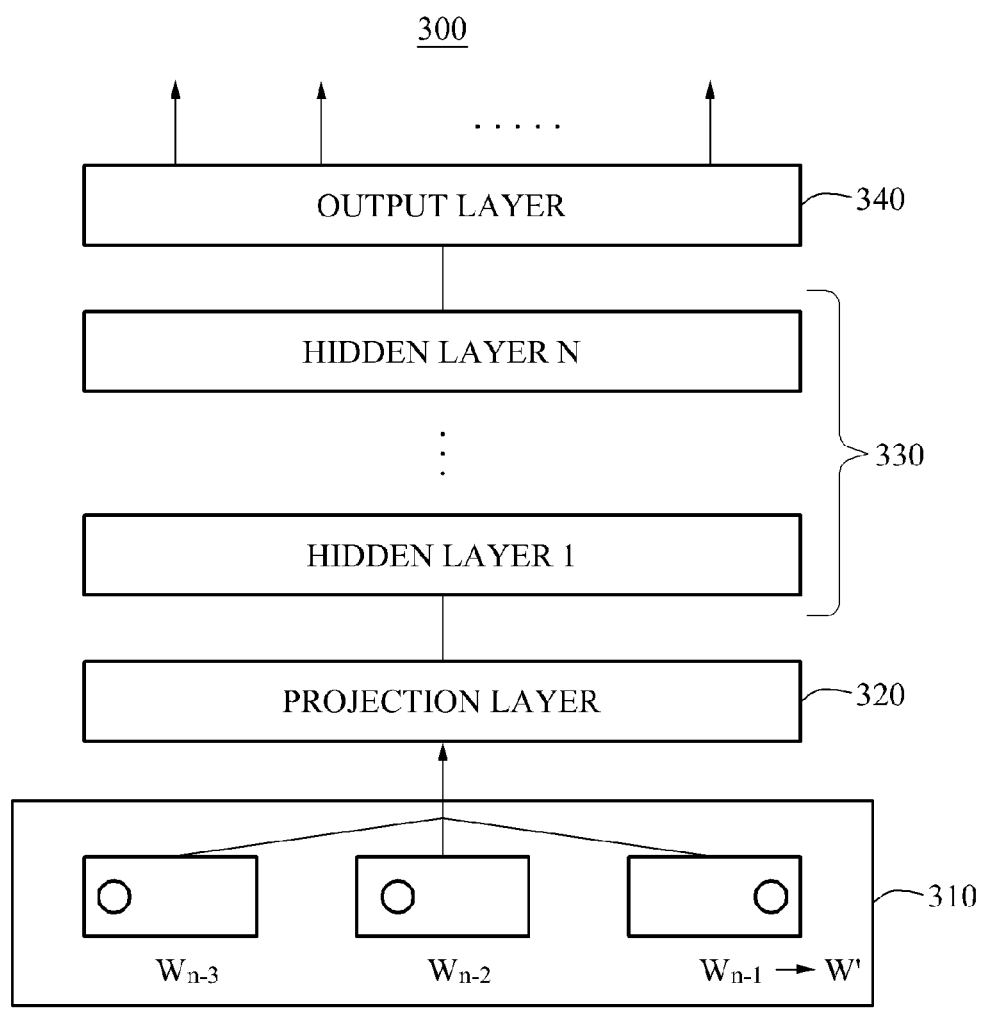
FIG. 3 is a diagram illustrating an example of a neural network used for a language model.

FIG. 3 illustrates an example of a neural network used for a language model.

Referring to FIG. 3, a neural network 300 to be trained by an apparatus for training a language model includes a plurality of layers. For example, the neural network 300 includes a projection layer 320, a hidden layer 330, and an output layer 340. A lowermost layer is the projection layer 320 into which training data is input, and an uppermost layer is the output layer 340 from which an output value of the neural network 300 with respect to an input value is output. An intermediate layer between the projection layer 320 and the output layer 340 is the hidden layer 330. The neural network 300 includes a plurality of hidden layers 330, and the neural network 300 including the plurality of hidden layers 330 may be referred to as a deep neural network. The neural network 300 may be stored in a memory, as nodal trees. The layers of the neural network 300 may be stored in a stack structure for a layer-by-layer processing.

The output layer 340 may generate an output of the neural network 300 based on signals received from artificial neurons of the hidden layers 330. The hidden layers 330 may convert information received from the projection layer 320 into easily predictable information. Artificial neurons included in the projection layer 320 and the hidden layers 330 may be connected to each other through edges having connection weights, and artificial neurons included in the hidden layers 330 and the output layer 340 may also be connected to each other through edges having connection weights.

The neural network 300 may be connected in a direction of the projection layer 320→the hidden layers→330 the output layer 340. When training data is input into each artificial neuron of the projection layer 320, the training data may be converted by each artificial neuron of the projection layer 320 and transmitted to the hidden layers 330, and an output value corresponding to the input training data may be generated by the output layer 340. The training data may be input from an external memory. The output value generated by the output layer may, for example, be provided to a user in a file format, displayed on a display screen, or provided to a device as a user command.

A neural network 300 based language model may receive n words included in the training data. In FIG. 3, a case in which the neural network 300 learns a word sequence including three words 310, a word $W_{n-3}$, a word $W_{n-2}$, and a word $W_{n-1}$, may be assumed. In this example, the apparatus for training a language model may replace a portion of the three words with a predetermined erroneous word to train the neural network 300. As shown in FIG. 3, the apparatus for training a language model may generate error-containing training data by replacing the word $W_{n-1}$ with an erroneous word W', and train the neural network 300 using the error-containing training data. The error-containing training data may be converted into a form of an input vector, and input into the projection layer 320. The input vector input into the projection layer 320 may have a form in which 1-hot vectors corresponding to the respective words are concatenated with each other. For example, when the word $W_{n-3}$, the word $W_{n-2}$, and the erroneous word W' are expressed by vectors of (1, 0, 0, 0), (0, 1, 0, 0), and (0, 0, 1, 0), respectively, the input vector input into the projection layer 320 may have a form of (1, 0, 0, 0, 0, 1, 0, 0, 0, 0, 1, 0).

The apparatus for training a language model may select the erroneous word W' to replace the word $W_{n-1}$ with from among candidate words associated with the word $W_{n-1}$, and the candidate words may include words phonetically similar to the word $W_{n-1}$. For example, when the word $W_{n-1}$ is "write", "right" which is phonetically similar to "write" may be selected as the erroneous word W', and training data including "right" may be input into the neural network 300.

A number of words to be replaced with erroneous words, among words to be input into the neural network 300, may be predetermined, and which word is to be replaced with an erroneous word, among the words to be input into the neural network 300, may be determined at random.

The error-containing training data may be input into the projection layer 320, and the projection layer 320 may perform semantic embedding or grammatical embedding. The semantic embedding or grammatical embedding may prevent extremely low probabilities of several expected output word sequences, whereby a recognition result may improved. The output layer 340 may determine a probability of a word following the input three words using a Softmax method. The Softmax method refers to a method of adjusting a selection probability by maintaining a maximum selection possibility of a currently optimal solution, and assigning weights to remaining solutions based on estimated values.

The apparatus for training a language model may compare an output value of the output layer 340 to a desired expected value, and adjust connection weights of edges among the artificial neurons included in the neural network 300 to reduce a difference between the output value and the expected value. The apparatus for training a language model may train the neural network 300 by adjusting the connection weights. For example, through a process of multiplying the training data input into the projection layer 320 by connection weights and summing up corresponding results when passing through the hidden layers 330, the output value may be generated from the output layer 340. The output value generated by the output layer 340 may differ from an expected output value. The apparatus for training a language model may update the connection weights to minimize the corresponding difference.

Figure 4:
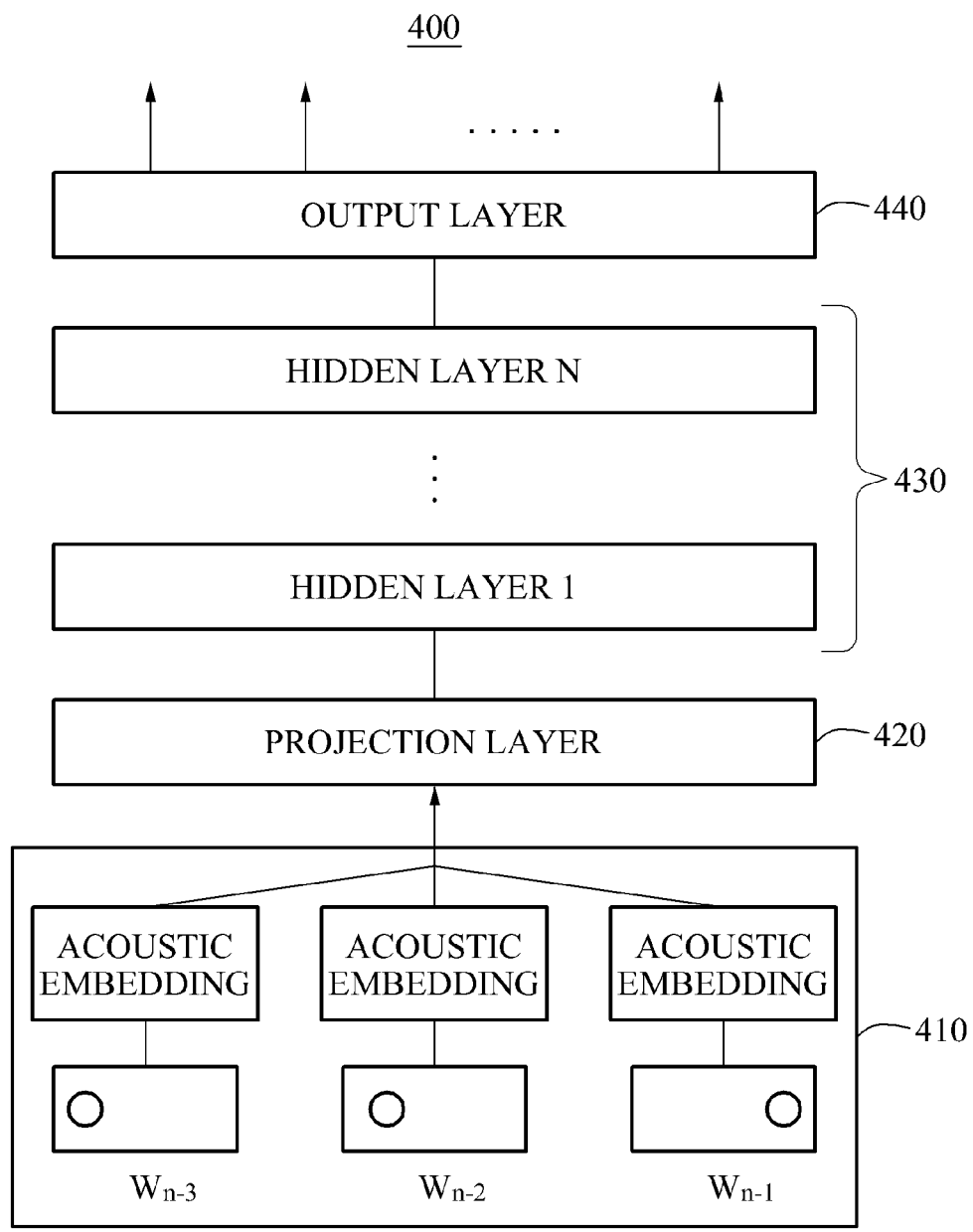
FIG. 4 is a diagram illustrating an example of a neural network used for a language model.

FIG. 4 illustrates an example of a neural network used for a language model.

An apparatus for training a language model may train a neural network 400 based language model based on acoustic information. The apparatus for training a language model may perform acoustic embedding 410 on training data. Through the acoustic embedding 410, a word $W_{n-3}$, a word $W_{n-2}$, and a word $W_{n-1}$ to be learned may be converted into continuous vector values by a pre-learned acoustic embedding matrix. For example, the word $W_{n-3}$ may be converted into a continuous vector value, for example, (0.12, 0.54, 0.98, . . . , 0.05) by the acoustic embedding matrix.

Words in the training data may be converted into vector values based on phonetic similarities by the acoustic embedding 410, and the vector values of the corresponding words may be determined so that phonetically similar words may be disposed at adjacent positions in a vector space. The phonetically similar words may be disposed at adjacent positions in the vector space through the acoustic embedding 410.

Respective vector values of the word $W_{n-3}$, the word $W_{n-2}$, and the word $W_{n-1}$ converted by the acoustic embedding 410 may be input into a projection layer 420 of the neural network 400 in a form of being concatenated with each other, and the projection layer 420 may perform semantic embedding or grammatical embedding. Hidden layers 430 disposed between the projection layer 420 and an output layer 440 may convert information received from the projection layer 420 into easily predictable information. The output layer 440 may determine a probability of a word following the input three words.

The apparatus for training a language model may compare an output value of the output layer 440 to a desired expected value, and adjust connection weights of edges among artificial neurons included in the neural network 400 to reduce a difference between the output value and the expected value. The apparatus for training a language model may train the neural network 400 by adjusting the connection weights.

Figure 5:
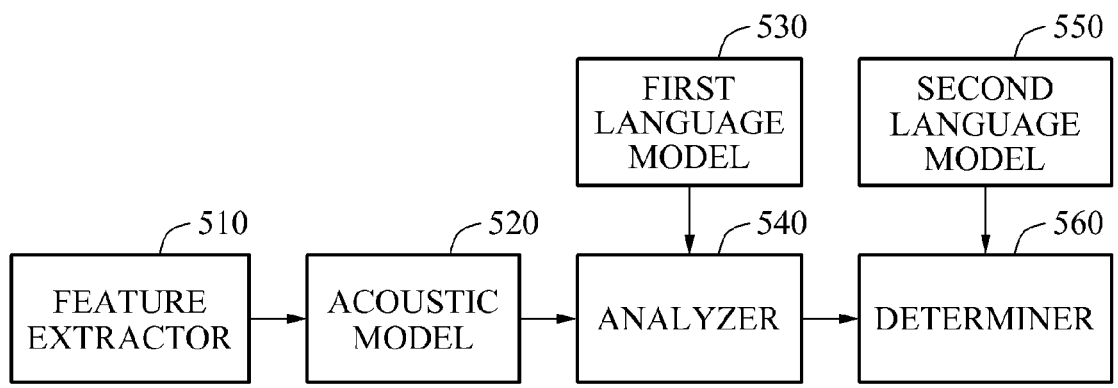
FIG. 5 is a block diagram illustrating an example of an apparatus for recognizing a speech.

FIG. 5 illustrates an example of an apparatus for recognizing a speech.

An apparatus 500 for recognizing a speech may determine the words included in a sentence expressed in speech data. Referring to FIG. 5, the apparatus 500 for recognizing a speech includes a feature extractor 510, an acoustic model 520, a first language model 530, an analyzer 540, a second language model 550, and a determiner 560. The feature extractor 510, the analyzer 540, and the determiner 560 may be implemented with a hardware component, such as a processor and a memory. The acoustic model 520, the first language model 530, the second language model 550 may be stored in a memory.

Speech data may be segmented based on a predetermined time unit, and the segmented speech data may be sequentially input into the apparatus 500 for recognizing a speech. The feature extractor 510 may extract a feature value from the speech data. For example, the feature extractor 510 may extract a relative variation changing over time from the speech data as the feature value. The acoustic model 520 may recognize and output the speech data in phoneme units based on the feature value extracted from the speech data.

The first language model 530 may estimate a connection relationship among words in the speech data. The first language model 530 may provide a probability value to determine the connection relationship among the words in the speech data. The first language model 530 may estimate the connection relationship among the words based on a neural network, and the neural network may be pre-trained using error-containing training data.

The analyzer 540 may generate candidate recognition results with respect to the speech data based on a resulting value output from the acoustic model 520 and a resulting value output from the first language model 530. The analyzer 540 may estimate a connection path of the words in the speech data based on the output values of the acoustic model 520 and the first language model 530.

The determiner 560 may determine a final recognition result with respect to the speech data, among the candidate recognition results, based on the second language model 550 with a more excellent recognition performance than the first language model 530. The second language model 550 may be a language model with a more excellent recognition performance than the first language model 530. For example, the second language model 550 may be a language model based on a recurrent neural network or a long short term memory (LSTM). The recurrent neural network may refer to a neural network in which artificial neurons included in a hidden layer are recurrently connected with each other in different time periods. A plurality of candidate solutions with respect to the speech data may be deduced through the first language model 530, and a final solution may be determined through the second language model 550 with a more excellent recognition performance than the first language model 530, whereby a processing time and an amount of resources to be used may be reduced.

The determiner 560 may recalculate probability values of the candidate recognition results based on the second language model 550, and determine a candidate recognition result having a greatest probability value to be the final recognition result with respect to the speech data.

Figure 6:
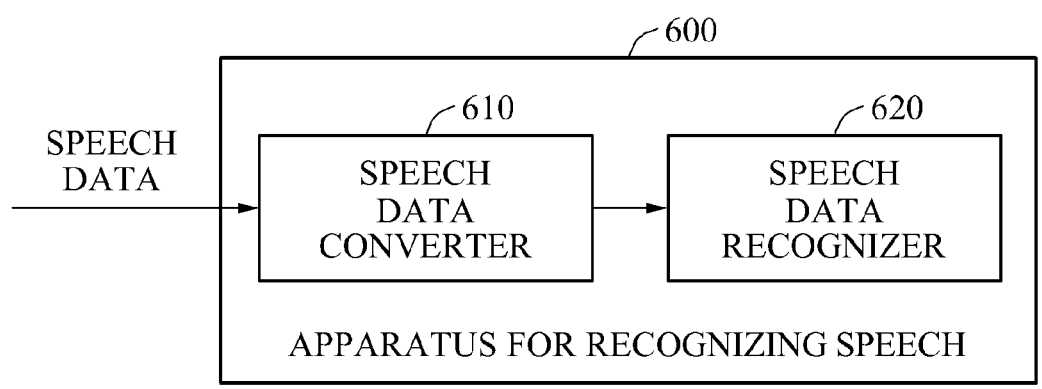
FIG. 6 is a block diagram illustrating an example of a configuration of an apparatus for recognizing a speech.

FIG. 6 illustrates an example of an apparatus for recognizing a speech.

An apparatus 600 for recognizing a speech may recognize speech data based on a trained neural network language model. The apparatus 600 for recognizing a speech may be embedded in a portable terminal such as a smart phone and a personal digital assistant (PDA), a wearable device to be attached to and detached from a body of a user, and a terminal including various voice command systems. Referring to FIG. 6, the apparatus 600 for recognizing a speech includes a speech data converter 610, and a speech data recognizer 620. The speech data converter 610 and the speech data recognizer 620 may be implemented with a processor and a memory, for example.

The speech data converter 610 may convert words in speech data into vector values based on phonetic similarities among words. The speech data converter 610 may deduce a phoneme sequence from the speech data, and determine a vector value with respect to the phoneme sequence based on the phonetic similarities. The speech data converter 610 may convert the words in the speech data into the vector values based on the phonetic similarities using acoustic embedding. In this example, the speech data may be collected by a microphone installed in a portable terminal or an electronic device, or may be obtained from a data file.

The speech data converter 610 may convert the words in the speech data into the vector values based on the phonetic similarities by applying a pre-learned acoustic embedding matrix to the words in the speech data. By the acoustic embedding matrix, phonetically similar words may have similar vector values or similar feature values. For example, the vector values may be determined using the acoustic embedding matrix so that the phonetically similar words may be disposed at adjacent positions in a vector space.

The speech data recognizer 620 may determine a content expressed by the speech data. The speech data recognizer 620 may recognize the speech data by estimating a connection relationship among the words in the speech data. The speech data recognizer 620 may apply a vector value of the speech data output from the speech data converter 610 to the neural network language model, and determine a result of recognizing the speech data based on a result of the applying.

The speech data recognizer 620 may recognize the speech data based on a pre-learned and stored acoustic embedding table. For example, the acoustic embedding table may include information on vector values of general words determined based on phonetic similarities among phoneme sequences. The acoustic embedding table may include vector information that expresses general words as single-dimensional points in a vector space. The speech data recognizer 620 may select a vector value disposed at a position closest to a vector value of a target word in the speech data, from among vector values of words included in the acoustic embedding table, and determine a word corresponding to the selected vector value to be the target word of the speech data.

Figure 7:
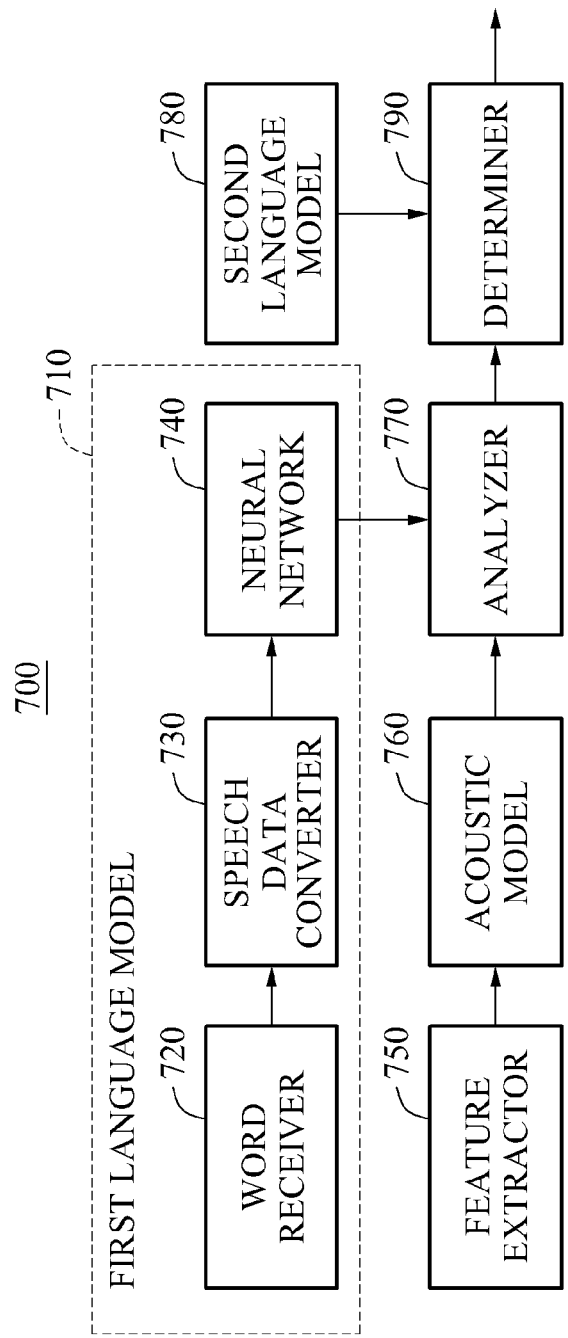
FIG. 7 is a block diagram illustrating an example of a configuration of an apparatus for recognizing a speech.

FIG. 7 illustrates an example of an apparatus for recognizing a speech.

An apparatus 700 for recognizing a speech may determine words included in a sentence expressed in speech data. Referring to FIG. 7, the apparatus 700 for recognizing a speech includes a first language model 710, a feature extractor 750, an acoustic model 760, an analyzer 770, a second language model 780, and a determiner 790. The first language model 710 includes a word receiver 720, a speech data converter 730, and a neural network 740. The feature extractor 750, an analyzer 770 and a determiner 790 may be implemented with hardware components such as a processor, a memory a chip or a combination thereof. The first language model 710 may include a processor, a memory or a combination thereof. The word receiver 720 and the speech data converter 730 may be implemented with a processor, a memory, or a combination thereof. The neural network 740 may be stored in a memory.

Speech data may be segmented based on a predetermined time duration, and the segmented speech data may be sequentially input into the apparatus 700 for recognizing a speech. The feature extractor 750 may extract a feature value from the speech data. For example, the feature extractor 750 may extract a relative variation changing over time from the speech data as the feature value. The acoustic model 760 may recognize and output the speech data in phoneme units based on the feature value extracted from the speech data.

The first language model 710 may estimate a connection relationship among words in the speech data based on the neural network 740. The word receiver 720 may receive at least one word included in the speech data as an input.

The speech data converter 730 may convert words in the speech data into vector values based on phonetic similarities among words. The speech data converter 730 may deduce a phoneme sequence from the speech data, and determine a vector value with respect to the phoneme sequence based on the phonetic similarities. The speech data converter 730 may convert the words in the speech data into the vector values based on the phonetic similarities by applying a pre-learned acoustic embedding matrix to the words in the speech data. By the acoustic embedding matrix, phonetically similar words may have similar vector values or similar feature values. The vector values may be determined using the acoustic embedding matrix so that the phonetically similar words may be disposed at adjacent positions in a vector space.

The neural network 740 may include artificial neurons arranged based recognition model, and may provide a probability value to determine a connection relationship among the word in the speech data.

The analyzer 770 may generate candidate recognition results with respect to the speech data based on a resulting value output from the acoustic model 760 and a resulting value output from the first language model 710. The analyzer 770 may estimate a connection path of the words in the speech data based on the output values of the acoustic model 760 and the first language model 710.

The determiner 790 may determine a final recognition result with respect to the speech data, among the candidate recognition results, based on the second language model 780 with a more excellent recognition performance than the first language model 710. The second language model 780 may be a language model with a more excellent recognition performance than the first language model 710. For example, the second language model 780 may be a language model based on a recurrent neural network or an LSTM. The determiner 790 may recalculate probability values of the candidate recognition results based on the second language model 780, and determine a candidate recognition result having a greatest probability value to be the final recognition result with respect to the speech data.

Figure 8:
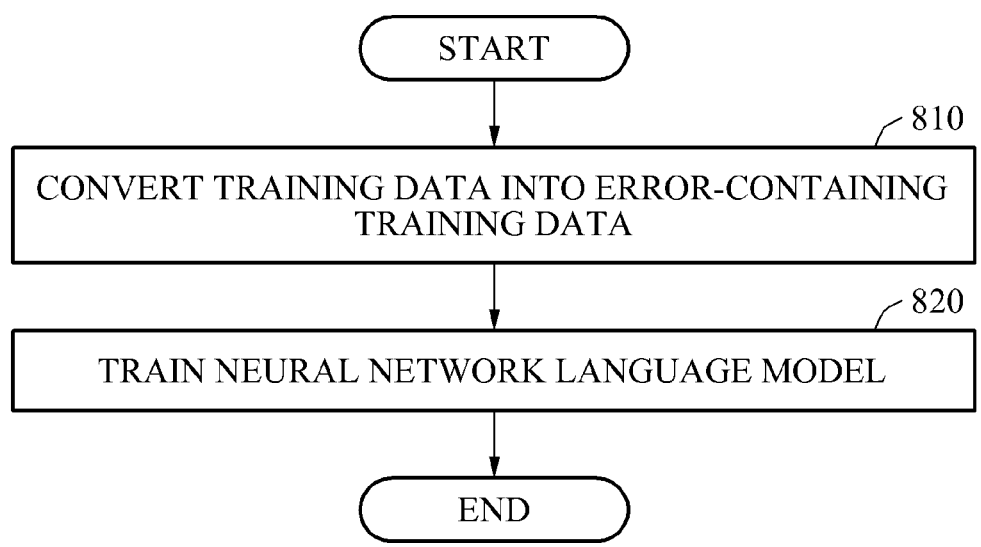
FIG. 8 is a flowchart illustrating an example of a method of training a language model.

FIG. 8 illustrates a flowchart of an example of a method of training a language model.

Referring to FIG. 8, an apparatus for training a language model converts training data into training data that intentionally includes an error. The apparatus for training a language model may select at least one word to be replaced with an erroneous word from among words in the training data. For example, the apparatus for training a language model may determine a last word or a randomly determined word, among the words in the training data, to be replaced with an erroneous word.

The apparatus for training a language model may select the erroneous word from among a plurality of candidate words. The candidate words for replacing the word in the training data may be determined based on phonetic similarities among the words. The candidate words may be phonetically similar to the word of the training data to be replaced with the erroneous word. A probability of each candidate word being selected as an erroneous word for replacement may be identical, or a predetermined candidate word may have a relatively high probability of being selected as an erroneous word. Candidate words with respect to each word to be replaced with an erroneous word may be pre-learned and stored. The apparatus for training a language model may generate the error-containing training data by replacing the selected word with the erroneous word.

In operation 820, the apparatus for training a language model trains a language model that is based on a neural network by using the error-containing training data. The apparatus for training a language model may train the neural network language model through supervised learning. For example, the apparatus for training a language model may train the neural network language model by updating connection weights of edges among artificial neurons through a delta rule and error back-propagation learning.

Figure 9:
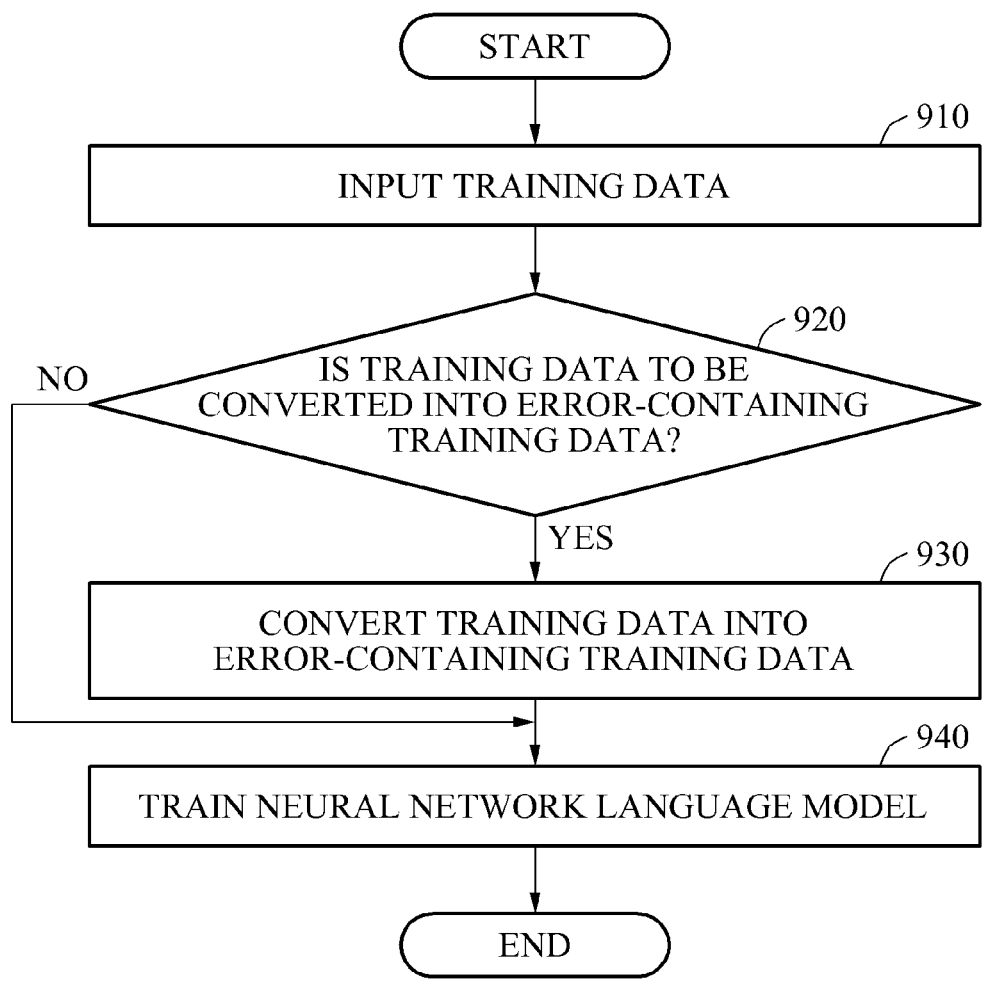
FIG. 9 is a flowchart illustrating an example of a method of training a language model.

FIG. 9 illustrates a flowchart of an example of a method of training a language model.

Referring to FIG. 9, in operation 910, training data is input into an apparatus for training a language model. Speech data corresponding to sequential data may be input as the training data. The apparatus for training a language model may store the training data received from an external device, and extract a feature from the stored training data.

In operation 920, the apparatus for training a language model determines whether the training data is to be converted into error-containing training data. For example, the apparatus for training a language model may determine the training data to be converted into the error-containing training data based on a predetermined iteration period or a predetermined probability.

In the event that the apparatus determines not to convert the training data into error-containing training data, the apparatus for training a language model trains a neural network language model based on the original training data, in operation 940.

In the event that the apparatus determines to convert the training data into error-containing training data, the apparatus for training a language model converts the training data into the error-containing training data, in operation 930, by introducing an error into the training data. The apparatus for training a language model may select at least one word to be replaced with an erroneous word from among words in the training data. The apparatus for training a language model may select the erroneous word from among a plurality of candidate words. The candidate words may be determined based on phonetic similarities among words. Candidate words with respect to each word to be replaced with an erroneous word may be pre-learned and stored in a memory. The apparatus for training a language model may generate the error-containing training data by replacing the selected word with the erroneous word.

In operation 940, the apparatus for training a language model trains the neural network language model using the error-containing training data. The apparatus for training a language model may train the neural network language model using various methods of the related technical field. For example, the apparatus for training a language model may update connection weights of edges among artificial neurons included in the neural network through a delta rule and error back-propagation learning.

Figure 10:
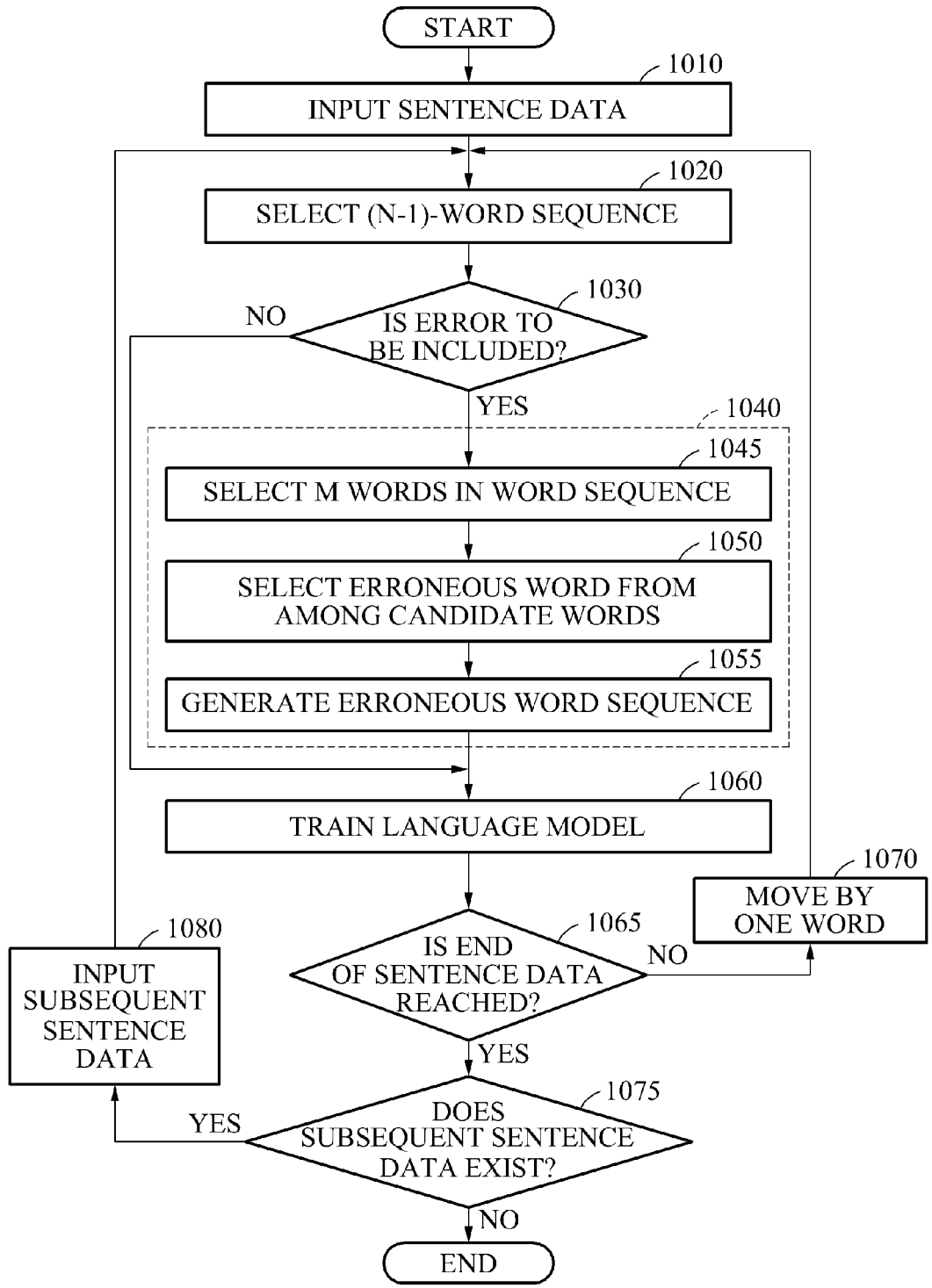
FIG. 10 is a flowchart illustrating an example of a method of training a language model.

FIG. 10 illustrates a flowchart of an example of a method of training a language model.

Referring to FIG. 10, in operation 1010, sentence data to be used to train a language model is input into an apparatus for training a language model.

In operation 1020, the apparatus for training a language model selects a word sequence including a predetermined number of words, among all words in the sentence data. For example, the apparatus for training a language model may select a word sequence including first N−1 words, among all of the words in the sentence data.

In operation 1030, the apparatus for training a language model determines whether an error is to be included in the selected word sequence. For example, the apparatus for training a language model may determine whether an error is to be included in the word sequence including the provided N−1 words based on a predetermined probability or a predetermined period.

In response to a determination by the apparatus that an error is not to be included in the word sequence, the apparatus for training a language model trains a neural network language model based on the word sequence selected in operation 1020, in operation 1060.

In response to a determination by the apparatus that an error is to be included in the word sequence, the apparatus for training a language model includes an erroneous word in the word sequence, in operation 1040.

In detail, in operation 1045, the apparatus for training a language model retrieves the training data and selects M words from among the N−1 words included in the word sequence. In this example, M is a natural number less than or equal to N−1. In operation 1050, the apparatus for training a language model selects the erroneous word from among candidate words. The apparatus for training a language model may select M erroneous words to replace the M words selected in operation 1045 with, from among the candidate words. The candidate words may be determined based on phonetic similarities among words. Candidate words with respect to each word to be replaced with an erroneous word may be pre-learned and stored. A probability of each candidate word being selected as an erroneous word may be identical, or a predetermined candidate word may have a relatively high probability of being selected as an erroneous word. In operation 1055, the apparatus for training a language model generates an erroneous word sequence by replacing the M words selected in operation 1045 with the M erroneous words selected in operation 1050.

In operation 1060, the apparatus for training a language model trains the neural network language model based on the erroneous word sequence.

In operation 1065, the apparatus for training a language model determines whether the word sequence reaches an end of the sentence data.

When the word sequence does not reach the end of the sentence data, the apparatus for training a language model moves the word sequence by one word among the words in the sentence data, in operation 1070. For example, when the sentence data is "this is a test sentence" and a current word sequence selected in the sentence data is "this is a", a word sequence of "is a test" may be determined in operation 1070. The apparatus for training a language model may re-perform the process starting from operation 1020 based on the word sequence moved by one word.

When the word sequence reaches the end of the sentence data, the apparatus for training a language model determines whether subsequent sentence data to be used to train the language model exists, in operation 1075.

In the event that the subsequent sentence data exists, the apparatus for training a language model inputs the subsequence sentence data, in operation 1080, and may train the neural network language model based on the subsequent sentence data. The apparatus for training a language model may re-perform operations 1020 through 1075 with respect to the subsequent sentence data.

Figure 11:
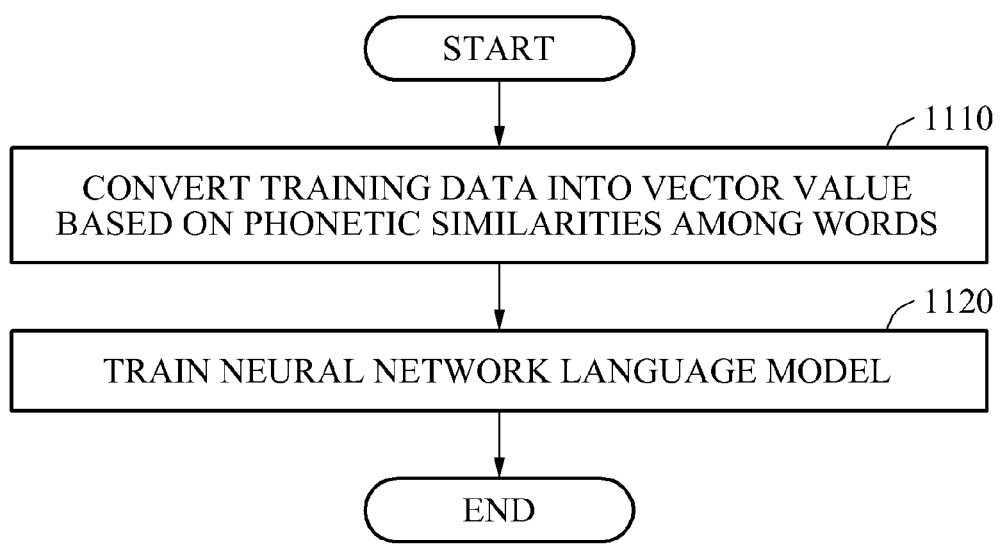
FIG. 11 is a flowchart illustrating an example of a method of training a language model.

FIG. 11 illustrates a flowchart illustrating an example of a method of training a language model.

Referring to FIG. 11, in operation 1110, an apparatus for training a language model converts training data into a vector value based on phonetic similarities among words. The apparatus for training a language model may convert words in the training data into vector values based on the phonetic similarities by applying an acoustic embedding matrix to the words in the training data. The apparatus for training a language model may determine the vector values of the words in the training data using the acoustic embedding matrix so that phonetically similar words may be disposed at adjacent positions in a vector space.

The words in the training data may be converted into continuous vector values by the acoustic embedding matrix. Through the acoustic embedding matrix, phonetically similar words may be converted into similar vector values. In an acoustic embedding space expressed by acoustic embedding, the phonetically similar words may be disposed relatively close to each other.

In operation 1120, the apparatus for training a language model trains a neural network language model based on the vector value of the training data determined in operation 1110. The apparatus for training a language model may train the neural network language model through supervised learning. The apparatus for training a language model may input the vector value of the training data determined in operation 1110 into the neural network language model, and adjust connection weights of edges among artificial neurons included in the neural network by comparing an output value of the neural network to an expected value. The apparatus for training a language model may train the neural network language model using various methods of the related technical field.

Figure 12:
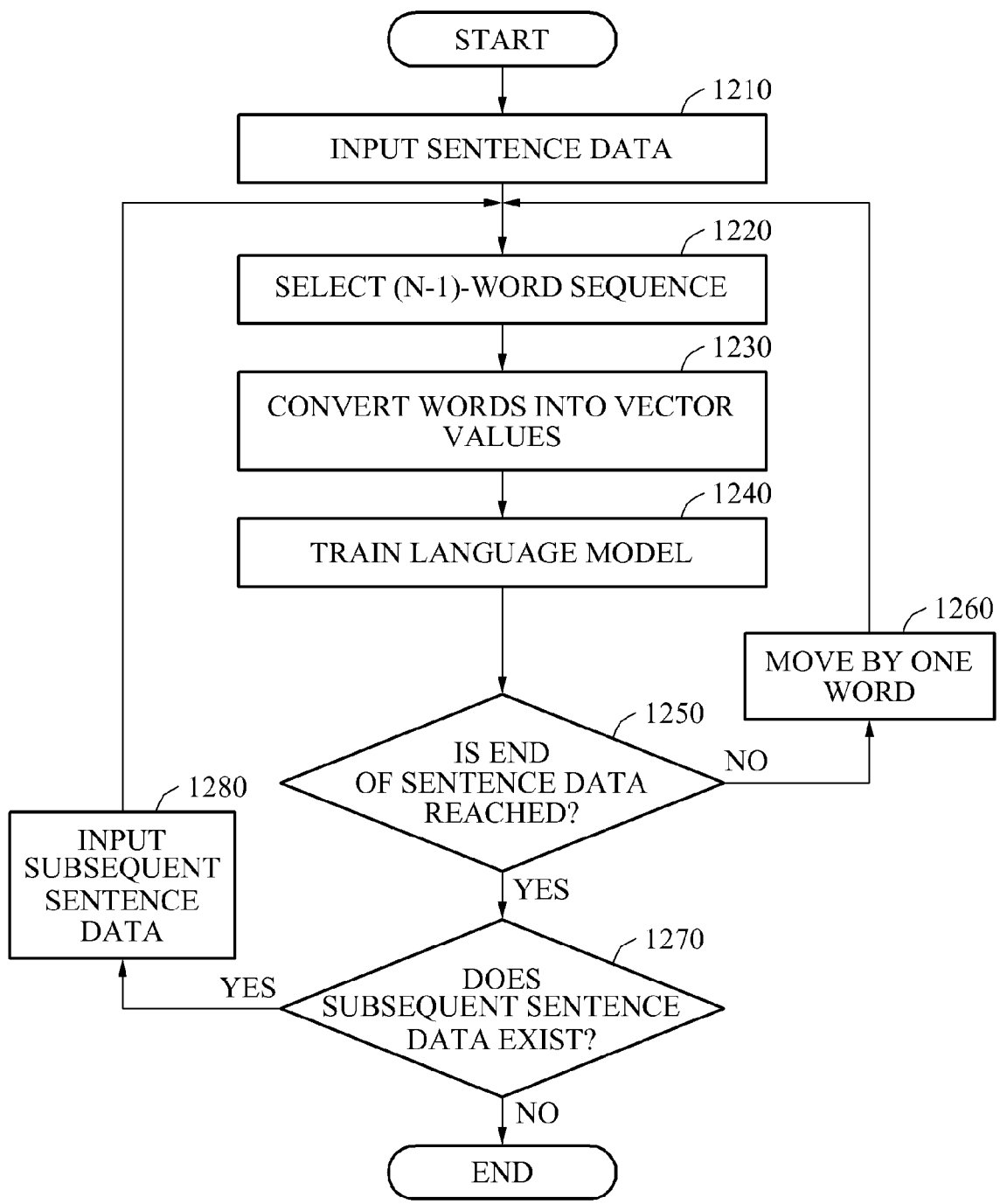
FIG. 12 is a flowchart illustrating an example of a method of training a language model.

FIG. 12 illustrates a flowchart of an example of a method of training a language model.

Referring to FIG. 12, in operation 1210, sentence data to be used to train a language model is input into an apparatus for training a language model.

In operation 1220, the apparatus for training a language model selects a word sequence including a predetermined number of words, among all words in the sentence data. For example, the apparatus for training a language model may select a word sequence including first N−1 words, among all of the words in the sentence data.

In operation 1230, the apparatus for training a language model converts the words in the word sequence into vector values based on phonetic similarities among words. The apparatus for training a language model may convert the words in the word sequence into the vector values based on the phonetic similarities by applying an acoustic embedding matrix to the word sequence. The words in the word sequence may be converted into continuous vector values by the acoustic embedding matrix.

In operation 1240, the apparatus for training a language model trains a neural network language model by applying the vector values converted in operation 1230 to the neural network language model. The apparatus for training a language model may train the neural network language model through supervised learning. The apparatus for training a language model may input the vector values determined in operation 1230 into the neural network language model, and adjust connection weights of edges among artificial neurons included in the neural network by comparing an output value of the neural network to an expected value.

In operation 1250, the apparatus for training a language model determines whether the word sequence reaches an end of the sentence data.

When the word sequence does not reach the end of the sentence data, the apparatus for training a language model moves the word sequence by one word among the words in the sentence data, in operation 1260. The apparatus for training a language model may perform the same operations 1220 through 1250 based on a word sequence newly determined by moving the word sequence by one word.

In response to the word sequence reaching the end of the sentence data, the apparatus for training a language model determines whether subsequent sentence data to be used to train the language model exists, in operation 1270.

In the event that the subsequent sentence data exists, the apparatus for training a language model inputs the subsequent sentence data in operation 1280, and may train the neural network language model based on the subsequent sentence data. The apparatus for training a language model may re-perform operations 1220 through 1270 with respect to the subsequent sentence data.

Figure 13:
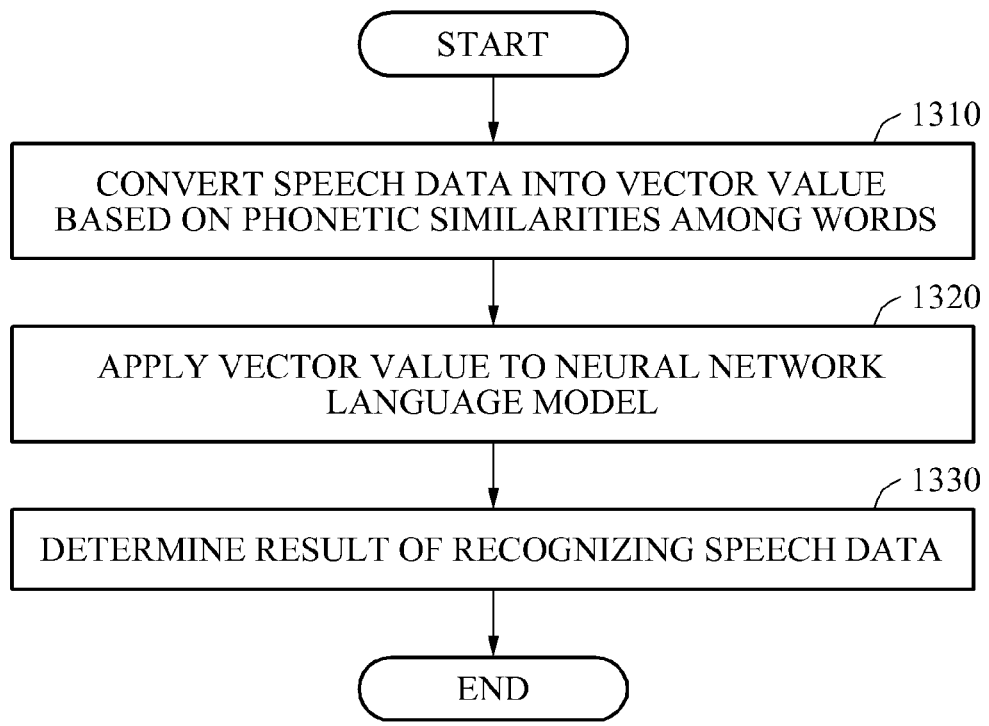
FIG. 13 is a flowchart illustrating an example of a method of recognizing a speech.

FIG. 13 illustrates a flowchart of an example of a method of recognizing a speech.

Referring to FIG. 13, in operation 1310, an apparatus for recognizing a speech converts speech data into a vector value based on phonetic similarities among words. The apparatus for recognizing a speech may convert words in the speech data into vector values based on the phonetic similarities by applying an acoustic embedding matrix to the words in the speech data. The apparatus for recognizing a speech may determine the vector values of the words in the speech data using the acoustic embedding matrix so that phonetically similar words may be disposed at adjacent positions in a vector space. The apparatus for recognizing a speech may convert the words in the speech data into continuous vector values using the acoustic embedding matrix. Through the acoustic embedding matrix, phonetically similar words may be converted into similar vector values.

In operation 1320, the apparatus for recognizing a speech applies the vector value of the speech data converted in operation 1310 to a neural network language model. The language model may provide a result of recognizing the speech data based on the vector value of the speech data. The language model may provide candidate recognition results with respect to the speech data based on the vector value of the input speech data.

In operation 1330, the apparatus for recognizing a speech determines a result of recognizing the speech data. The apparatus for recognizing a speech may determine a final recognition result with respect to the speech data among the candidate recognition results using another language model with a more excellent performance than the neural network language model.

Figure 14:
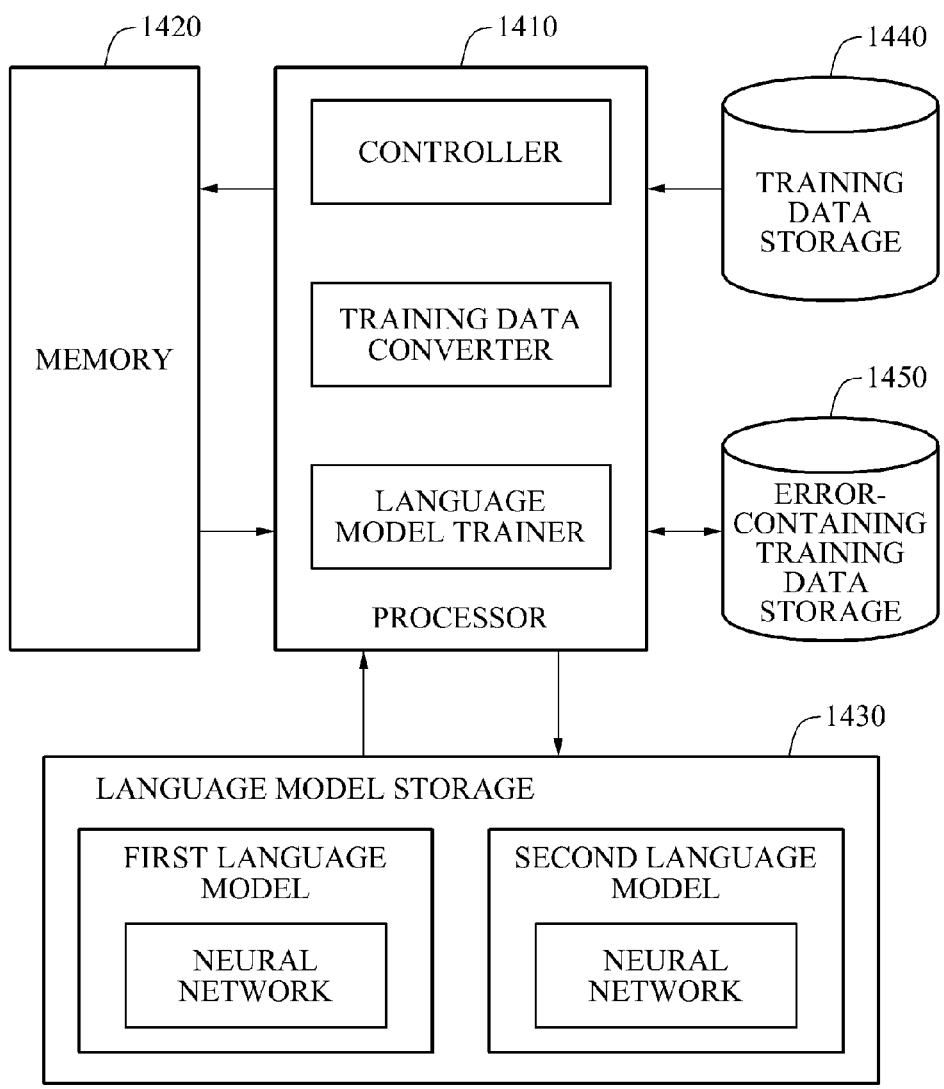
FIG. 14 is a diagram illustrating hardware components of an example of an apparatus for training a language model.

FIG. 14 illustrates an example of an apparatus for training a language model. The descriptions of examples of methods and apparatus for training a language model provided with reference to FIGS. 1-4, 8-12, and 15-17 apply to the example illustrated in FIG. 14. Thus, repetitive descriptions thereof are omitted.

Referring to FIG. 14, the apparatus includes a processor 1410, a language model storage 1430 that includes neural networks for a first language model and a second language model, a memory 1420 for storing calculated values or temporary values, a training data storage 1440, and an error-containing training data storage 1450. While a singular term is used to describe the processor 1410 for simplification, those skilled in the art understands that the processor 1410 may include more or more processors or cores. The processor 1410 may operate inside a computing device having a plurality of multi-core processors, for example. In another example, each of the multi-core processors may be a field-programmable gate array (FPGA), or a customizable multi-core processor. In another example, the processor 1410 may exchange data through an internal bus, such as a peripheral component interconnect express (PCIe) bus. In another example, the processor 1410 may be a single-core processor.

The training data stored in the training data storage 1440 may include speech data. For example, the training data may include audio recording samples that are tagged with texts corresponding to words found in a speech. The processor 1410 may determine whether the training data is to be converted into error-containing training data by introducing an error, and may convert the training data by introducing an error. The processor 1410 may store the error-containing training data in a second storage 1450. The processor 1410 may use the error-containing training data to train the language models stored in the language model storage 1430.

Figure 15:
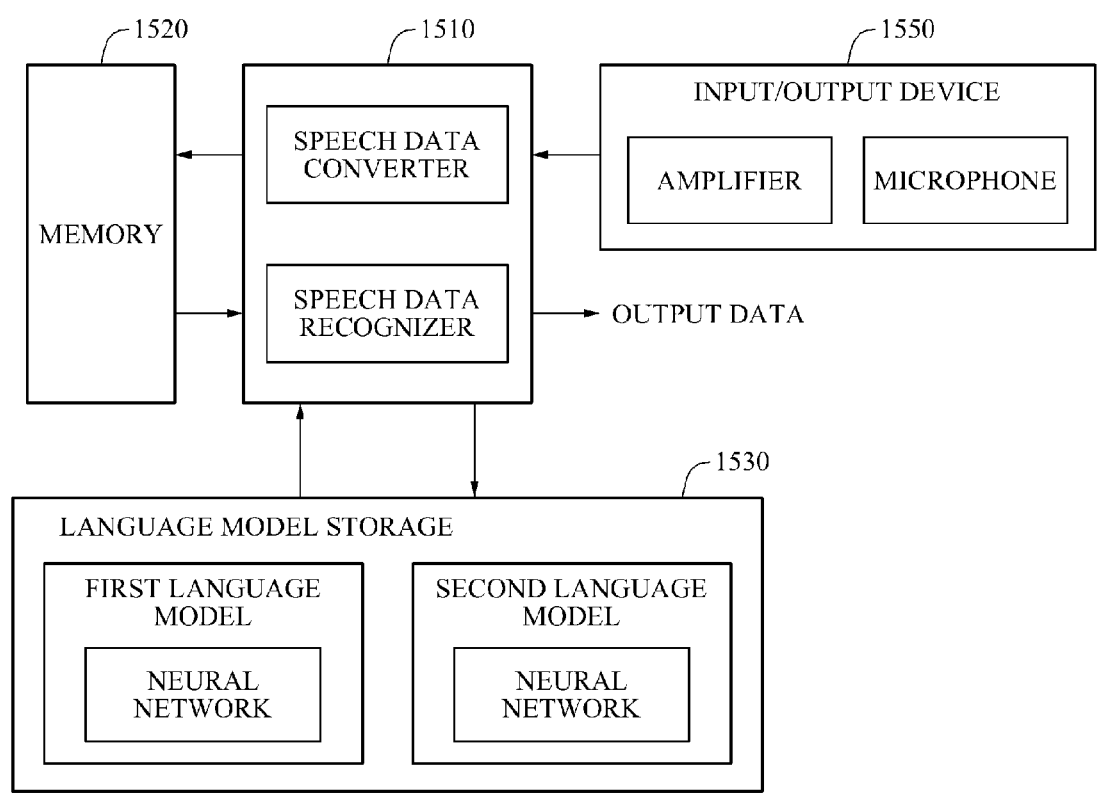
FIG. 15 is a diagram illustrating hardware components of an example of an apparatus for recognizing a speech.

FIG. 15 illustrates an example of an apparatus for recognizing a speech. The descriptions of examples of methods and apparatus for extending a neural network provided in reference to FIGS. 3-7, 13, 16 and 17 apply to the example illustrated in FIG. 15. Thus, repetitive descriptions thereof are omitted.

Referring to FIG. 15, the apparatus for recognizing a speech includes a processor 1510, a memory 1520, a language model storage 1530, and an input/output device 1550. The neural network language models trained by an apparatus for training a language model may be used in recognizing words included in a speech. The apparatus for recognizing a speech may be implemented as a portable terminal, such as a smart phone. An input device 1550 of the portable terminal, such as a microphone and an amplifier, may be used to obtain the speech data. The speech data may be processed by the processor 1510. The processor 1510 may segment the speech data and extract a feature value from the speech data, and convert the speech data into phoneme units. Then, the processor 1510 may use the trained language models stored in the language model storage 1530 to estimate the connection relationship between the words in the speech data. The processor 1510 may analyze the connection relationship to generate candidate recognition results with respect to the speech data. The processor 1510 may use both a first language model and a second language model to determine a final recognition result with respect to the speech data.

While an example of a processor 1510 that uses pre-trained language models are provided in FIG. 15, the present disclosure is not limited thereto. In another example, the processor for training the language models and for recognizing a speech data may be found in one device. Further, the illustrated examples are provided for the purpose of furthering the understanding of the present disclosure, and are not intended to limit the scope of any claims. Those skilled in the field would readily perceive variations in the components used and the arrangements of components, and such variations are within the scope of the present disclosure.

The apparatuses, units, modules, devices, and other components illustrated in FIGS. 1-7, 14 and 15 that perform the operations described herein with respect to FIGS. 8-13 are implemented by hardware components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 8-13. The hardware components also access, manipulate, process, create, and store data in response to execution of the instructions or software. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processor" or "computer" may be used in the description of the examples described herein, but in other examples multiple processors or computers are used, or a processor or computer includes multiple processing elements, or multiple types of processing elements, or both. For example, a processing device may include one or more processors, or one or more processors and one or more controllers. In addition, different processing configurations are possible, such as parallel processors or multi-core processors. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of training a language model, the method comprising:
    converting, using a processor, training data into error-containing training data; and
    training a neural network language model using the error-containing training data
    wherein the converting comprises selecting a word to be replaced with an erroneous word from words in the training data, and generating the error-containing training data by replacing the selected word with the erroneous word,
    wherein the neural network language model is used to estimate a connection relationship between words,
    wherein the selecting comprises randomly selecting the word from the words in the training data,
    wherein the processor is configured to use the trained language model to convert a speech into output data.

2. The method of claim 1, wherein the converting further comprises selecting the erroneous word from a plurality of candidate words associated with the selected word.

3. The method of claim 2, wherein the candidate words are determined based on phonetic similarities to the selected word.

4. The method of claim 2, wherein the selecting of the erroneous word comprises selecting the erroneous word based on weights assigned to the candidate words.

5. The method of claim 1, further comprising:
   determining whether the training data is to be converted into the error-containing training data.

6. The method of claim 1, wherein the neural network language model generates a probability value.

7. A non-transitory computer-readable storage medium comprising a program comprising instructions to cause a computer to perform the method of claim 1.

8. An apparatus for training a language model, the apparatus comprising:
   a processor configured to convert training data into error-containing training data, and train the neutral network language model using the error-containing training data,
   wherein the processor is configured to select a word to be replaced with an erroneous word from words in the training data, and generate the error-containing training data by replacing the selected word with the erroneous word,
   wherein the neural network language model is used to estimate a connection relationship between words,
   wherein the processor is configured to randomly select the word from the words in the training data,
   wherein the processor is configured to use the trained language model to convert a speech into output data.

9. The apparatus of claim 8, wherein the processor is configured to select the erroneous word from a plurality of candidate words determined based on phonetic similarities to the selected word.

10. The apparatus of claim 8, wherein the processor is configured to determine whether the training data is to be converted into the error-containing training data.

11. The apparatus of claim 8, wherein the processor generates the error-containing training data by retrieving the training data from a memory storage and replacing a selected word included in the training data with an erroneous word selected based on phonetic similarity of the erroneous word to the selected word.

12. The apparatus of claim 8, wherein the processor is configured to use the trained language model to convert a speech received from a microphone into output data.

13. The apparatus of claim 12, wherein the apparatus is configured to use the output data as a user command in controlling applications on the apparatus.

14. A method of training a language model, the method comprising:
   converting, using a processor, training data into error-containing training data; and
   training a neural network language model using the error-containing training data,
   wherein the converting comprises selecting a word to be replaced with an erroneous word from words in the training data and generating the error-containing training data by replacing the selected word with the erroneous word,
   wherein the neural network language model is trained by acoustically embedding the error-containing training data in a projection layer of the neural network,
   wherein the processor is configured to use the trained language model to convert a speech into output data.

* * * * *